US009228436B2

(12) United States Patent
Meyer et al.

(10) Patent No.: US 9,228,436 B2
(45) Date of Patent: Jan. 5, 2016

(54) PRESWIRLER CONFIGURED FOR IMPROVED SEALING

(75) Inventors: Christopher J. Meyer, San Diego, CA (US); Hyun D. Kim, San Diego, CA (US); Tsuhon Lin, San Diego, CA (US); Edward T. Ramirez, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 812 days.

(21) Appl. No.: 13/540,708

(22) Filed: Jul. 3, 2012

(65) Prior Publication Data

US 2014/0010634 A1 Jan. 9, 2014

(51) Int. Cl.

*F01D 9/02* (2006.01)
*F01D 25/12* (2006.01)
*F01D 5/08* (2006.01)
*F01D 9/04* (2006.01)
*F01D 25/28* (2006.01)
*B23P 11/00* (2006.01)
*F01D 25/00* (2006.01)

(52) U.S. Cl.

CPC ................ *F01D 5/081* (2013.01); *F01D 9/041* (2013.01); *F01D 25/12* (2013.01); *F01D 25/28* (2013.01); *F05D 2260/14* (2013.01); *Y10T 29/49826* (2015.01); *Y10T 29/49945* (2015.01)

(58) Field of Classification Search

CPC ........... F01D 5/08; F01D 5/081; F01D 5/082; F01D 5/084; F01D 9/041; F01D 9/06; F01D 9/065; F01D 11/001; F01D 25/12; F01D 25/28; F05D 2260/14; F05D 2260/221

USPC ................ 415/115, 116; 416/95, 96 R, 97 R; 29/889, 889.2, 889.22

See application file for complete search history.

(56) References Cited

U.S. PATENT DOCUMENTS

| | | | | |
|---|---|---|---|---|
| 3,989,410 | A * | 11/1976 | Ferrari | 415/115 |
| 4,236,869 | A * | 12/1980 | Laurello | 416/95 |
| 4,657,482 | A | 4/1987 | Neal | |
| 4,674,955 | A | 6/1987 | Howe et al. | |
| 4,730,978 | A | 3/1988 | Baran, Jr. | |
| 5,402,636 | A * | 4/1995 | Mize et al. | 60/806 |
| 6,234,746 | B1 | 5/2001 | Schroder et al. | |
| 6,595,741 | B2 | 7/2003 | Briesenick et al. | |
| 2011/0247345 | A1 | 10/2011 | Laurello et al. | |
| 2011/0247346 | A1 | 10/2011 | Kimmel et al. | |

* cited by examiner

*Primary Examiner* — Dwayne J White
*Assistant Examiner* — Alexander White
(74) *Attorney, Agent, or Firm* — Procopio, Cory, Hargreaves & Savitch LLP

(57) ABSTRACT

A preswirler of a gas turbine engine includes an outer ring. The outer ring includes an outer flange with a plurality of first holes, and an outer cylindrical portion extending from the outer flange. The preswirler also includes an inner ring. The inner ring includes an inner flange spaced apart from the outer flange. The inner ring also includes an inner cylindrical portion located within the outer cylindrical portion and a back portion extending from the inner flange to the inner cylindrical portion. The inner ring further includes a plurality of second holes.

15 Claims, 5 Drawing Sheets

PRESWIRLER CONFIGURED FOR IMPROVED SEALING

TECHNICAL FIELD

The present disclosure generally pertains to gas turbine engines, and is more particularly directed toward a preswirler configured for improved sealing to a diaphragm within a gas turbine engine air ducting system.

BACKGROUND

Gas turbine engines include compressor, combustor, and turbine sections. Portions of a gas turbine engine are subject to high temperatures. In particular, the first stage of the turbine section is subject to such high temperatures that the first stage is cooled by air directed through internal cooling passages from the compressor. In one such passage, air is directed through the diaphragm of a gas turbine engine and into the preswirler. An uncontrolled loss or leakage of air may lead to a loss of efficiency and improper cooling.

U.S. Pat. No. 4,730,978, to W. Baran, Jr., discloses a manifold structure for supplying cooling air to a turbine rotor of a gas turbine engine. The manifold is secured to the engine frame by a plurality of axially extending mounting bolts passing through corresponding mounting holes disposed in a thickened boss region of the manifold flow dividers.

SUMMARY OF THE DISCLOSURE

A preswirler of a gas turbine engine includes an outer ring. The outer ring includes an outer flange with a plurality of first holes arranged for coupling to a diaphragm. The outer ring also includes an outer cylindrical portion extending from the outer flange. The preswirler also includes an inner ring. The inner ring includes an inner flange spaced apart from the outer flange defining an opening for cooling air therebetween. The inner ring also includes an inner cylindrical portion located within the outer cylindrical portion. The inner cylindrical portion and the outer cylindrical portion define an annular chamber for cooling air therebetween. The inner ring also includes a back portion, extending from the inner flange to the inner cylindrical portion. The inner ring further includes a plurality of second holes arranged for coupling to the diaphragm. The outer flange, the inner flange, and the back portion define a radial chamber for cooling air therebetween. The radial chamber is in flow communication with the annular chamber.

A method for mounting a preswirler of a gas turbine engine to a diaphragm is also disclosed herein. The diaphragm includes a mounting portion. The mounting portion includes a first surface, a second surface, and a plurality of outer diameter holes. The preswirler includes an outer ring. The outer ring includes an outer flange with a plurality of first holes. The preswirler also includes an inner ring. The inner ring includes an inner flange spaced apart from the outer flange. The inner ring also includes a back portion extending from the inner flange. The method includes machining a plurality of through holes through the inner ring and inserting one of a plurality of bosses into each of the plurality of through holes. The plurality of bosses is welded to the inner ring and a hole is machined into each of the plurality of bosses. The method further includes machining a plurality of inner diameter holes through the mounting portion from the first surface to the second surface. The preswirler is coupled to the diaphragm by inserting an outer diameter coupler through each outer diameter hole and into a first hole, and inserting an inner diameter coupler through each inner diameter hole and into a second hole.

DETAILED DESCRIPTION

Figure 1:
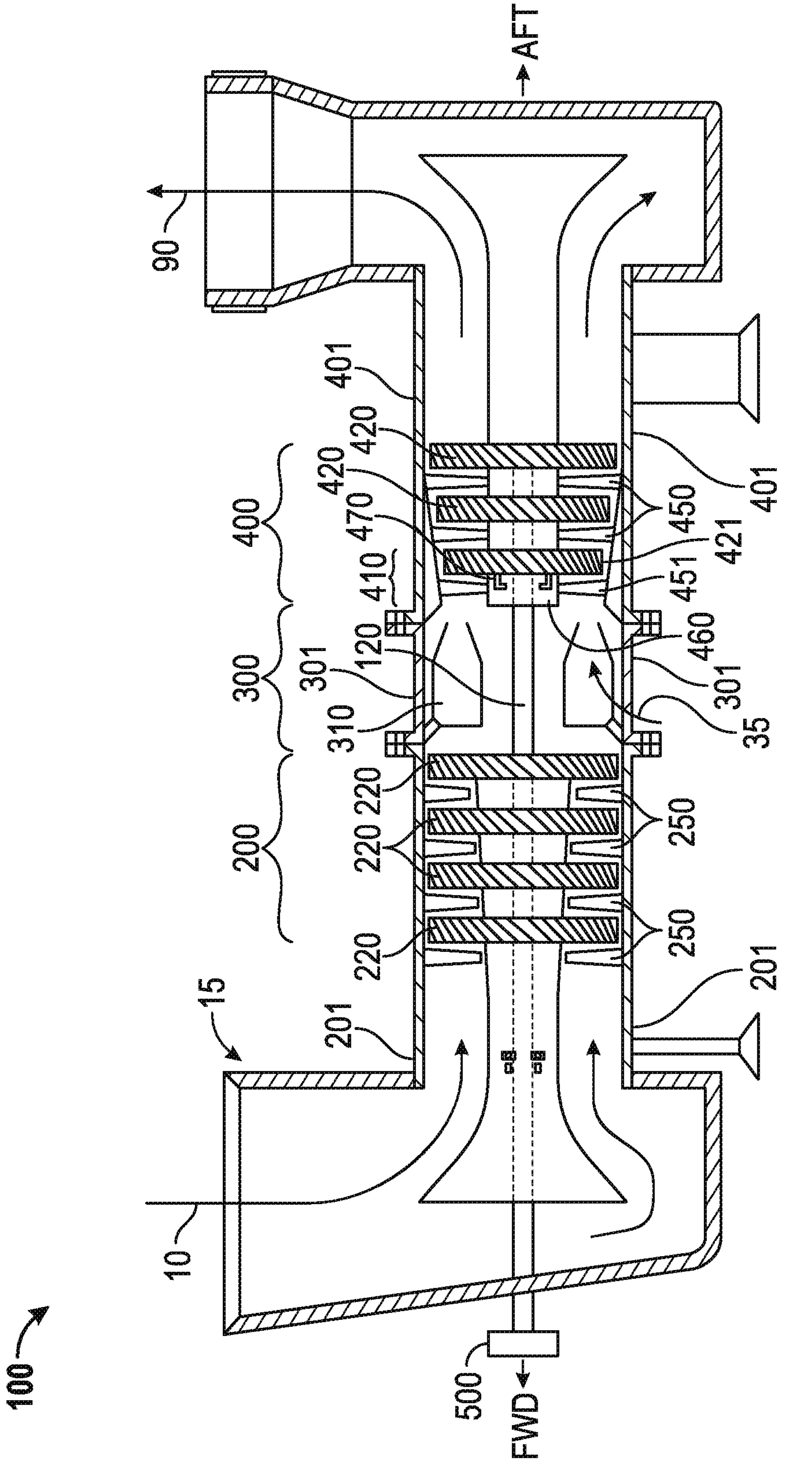
FIG. 1 is a schematic illustration of an exemplary gas turbine engine.

FIG. 1 is a schematic illustration of an exemplary gas turbine engine. A gas turbine engine 100 typically includes a compressor 200, a combustor 300, and a turbine 400. Air 10 enters an inlet 15 as a "working fluid" and is compressed by the compressor 200. Fuel 35 is added to the compressed air in the combustor 300 and ignited in the combustion chamber 310. Energy is extracted from the combusted fuel/air mixture via the turbine 400 and is typically made usable via a power output coupling 500. The power output coupling 500 is shown as being on the forward side of the gas turbine engine 100, but in other configurations it may be provided at the aft end of gas turbine engine 100. Exhaust 90 may exit the system or be further processed (e.g., to reduce harmful emissions or to recover heat from the exhaust).

The compressor 200 includes one or more compressor rotor assemblies 220 mechanically coupled to a shaft 120. The turbine 400 includes one or more turbine rotor assemblies 420 mechanically coupled to the shaft 120. As illustrated, the compressor rotor assemblies 220 and the turbine rotor assemblies 420 are axial flow rotor assemblies, where each rotor assembly includes a rotor disk that is circumferentially populated with a plurality of airfoils ("rotor blades").

Compressor stationary vanes ("stator vanes" or "stators") 250 axially precede the rotor blades associated with adjacent compressor rotor assemblies 220. A turbine nozzle assembly 450 axially precedes an adjacent turbine rotor assembly 420 that includes the rotor blades 425. A turbine nozzle assembly 450 paired with a turbine rotor assembly 420 it precedes is considered a turbine stage of a gas turbine engine 100. A turbine first stage 410 is a stage axially adjacent to the combustor 300. The turbine first stage 410 includes a first stage turbine nozzle assembly 451 and a first stage turbine rotor assembly 421. The first stage turbine nozzle assembly 451 includes a diaphragm 460.

The various components of the compressor 200 are housed in a compressor case 201 that is generally cylindrical. The various components of the combustor 300 and the turbine 400 are housed, respectively, in a combustor case 301 and a turbine case 401.

Figure 2:
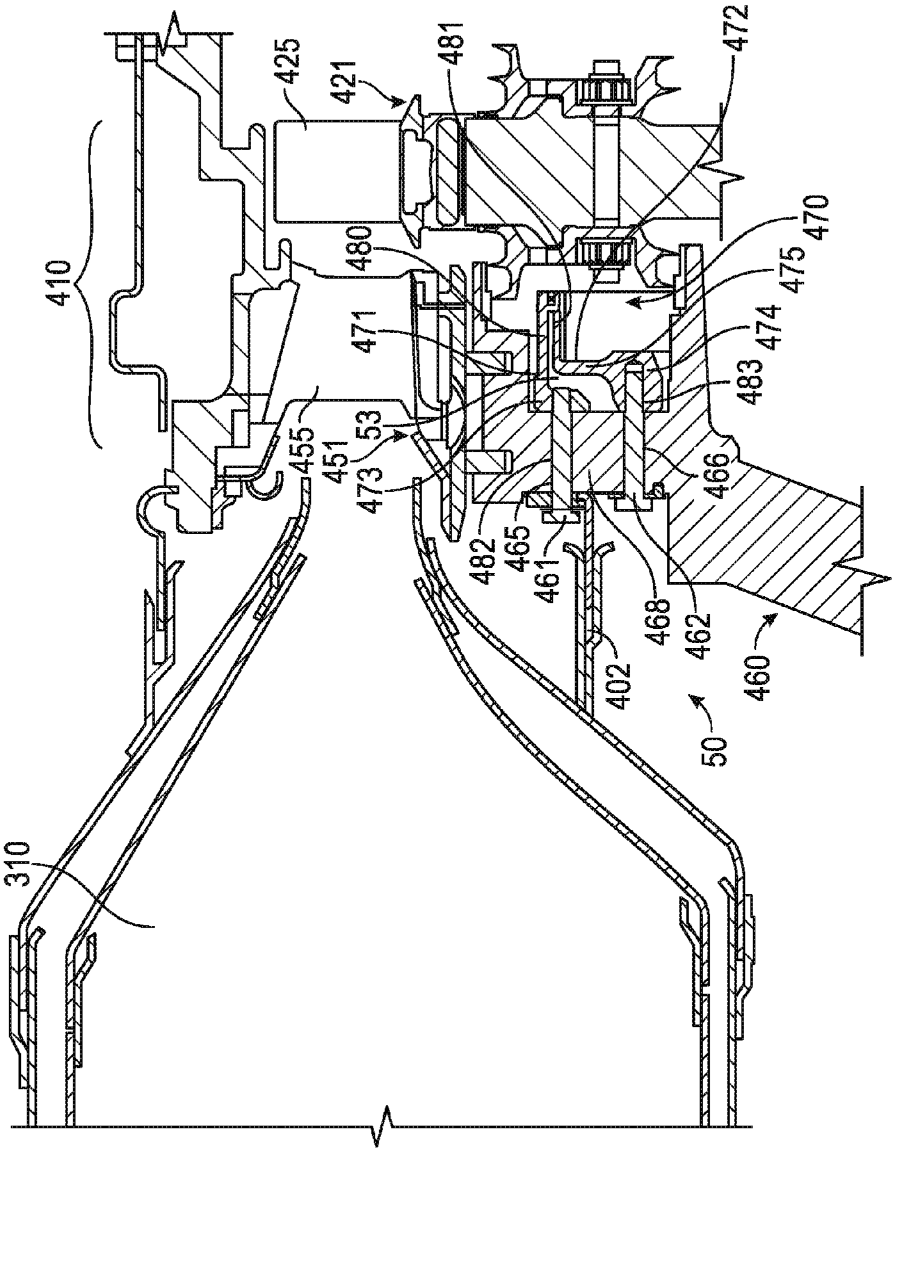
FIG. 2 is a cross-sectional view of a portion of a turbine first stage of a gas turbine engine.

FIG. 2 is a cross-sectional view of a portion of the turbine first stage 410 of FIG. 1. The first stage 410 of the gas turbine engine is adjacent to the combustion chamber 310 and includes the first stage turbine nozzle assembly 451. The first stage turbine nozzle assembly 451 includes the diaphragm 460, preswirler 470, and turbine nozzles 455. Cooling air from the compressor 200 travels along path 50, passes through the diaphragm 460, and into the preswirler 470. The preswirler 470 redirects the cooling air and imparts a tangential component to the velocity of the cooling air. The tangential component to the velocity of the cooling air may match the angular velocity of the first stage turbine rotor assembly 421.

A matching angular velocity between the cooling air and the first stage turbine rotor assembly 421 may be desirable because it may prevent the first stage turbine rotor assembly 421 from increasing the velocity of the cooling air. An increase in velocity of the cooling air would result in an increase in temperature and a pressure drop in the cooling air, which may reduce the effectiveness of the cooling air in cooling the first stage turbine rotor assembly 421. An increase in velocity of the cooling air may also result in a loss in efficiency due to the work imparted by the first stage turbine rotor assembly 421 on the cooling air to change the velocity of the cooling air. Once the cooling air passes into the first stage turbine rotor assembly 421 the cooling air cools the first stage turbine rotor assembly 421 including the turbine rotor blades 425. The described arrangement may also be used in other stages.

The preswirler 470 includes an outer ring 471 and an inner ring 472 defining a passage 53 for cooling air there between. The outer ring 471 includes an outer flange 473. The outer flange 473 may be thickened and may be configured to receive an outer diameter coupler 461 for mounting the preswirler 470 to the diaphragm 460. The outer ring 471 further includes an outer cylindrical portion 480. The outer cylindrical portion 480 extends aft from the aft end of the outer flange 473. The outer flange 473 includes a plurality of first holes 482 (only one is visible in FIG. 2; see FIG. 4) for mounting the preswirler 470 to the diaphragm 460.

The inner ring 472 includes an inner flange 474 spaced apart from the outer flange 473. The inner flange 474 may be thickened and may be configured to receive an inner diameter coupler 462 for mounting the preswirler 470 to the diaphragm 460. The inner ring 472 also includes an inner cylindrical portion 481 located within the outer cylindrical portion 480. The inner ring 472 also includes a back portion 475. The back portion 475 extends radially outward from the aft end of the inner flange 474 to the forward end of the inner cylindrical portion 481. The inner ring 472 includes a plurality of second holes 483 (only one is visible in FIG. 2; see FIG. 4) for mounting the preswirler 470 to the diaphragm 460.

The diaphragm 460 has a mounting portion 468 with cooling holes (not shown in the figures). The mounting portion 468 includes a plurality of outer diameter holes 465 that align with the plurality of first holes 482. The mounting portion 468 also includes a plurality of inner diameter holes 466 that align with the plurality of second holes 483. The mounting portion 468 may also include a cavity 469. The preswirler 470 may sit within the cavity 469 of the diaphragm 460 when mounted to the diaphragm 460.

The preswirler 470 may be mounted to the diaphragm 460 by plurality of outer diameter couplers 461 and a plurality of inner diameter couplers 462. An outer diameter coupler 461 passes through an outer diameter hole 465 and into a first hole 482 in the outer flange 473. An inner diameter coupler 462 passes through an inner diameter hole 466 and into a second hole 483 in the inner flange 474. The preswirler 470 configured for mounting to the diaphragm 460 may need at least ten first holes 482 and may need at least ten second holes 483 to sufficiently seal the preswirler 470 to the diaphragm 460 and prevent leakage.

In one embodiment, the outer diameter couplers 461, outer diameter holes 465, and the plurality of first holes 482 each total eighteen. The inner diameter couplers 462, inner diameter holes 466, and the plurality of second holes 483 each total eighteen. The outer diameter couplers 461 secure the inner turbine seal 402 to the diaphragm 460. In one embodiment the outer diameter couplers 461 and the inner diameter couplers 462 may be bolts. Alternative couplers such as rivets may also be used. The first holes 482 and the second holes 483 may be threaded. Some embodiments that encompass bolting the preswirler 470 to the diaphragm 460 do not encompass a press fit or an interference fit between the preswirler 470 and the diaphragm 460.

Figure 3:
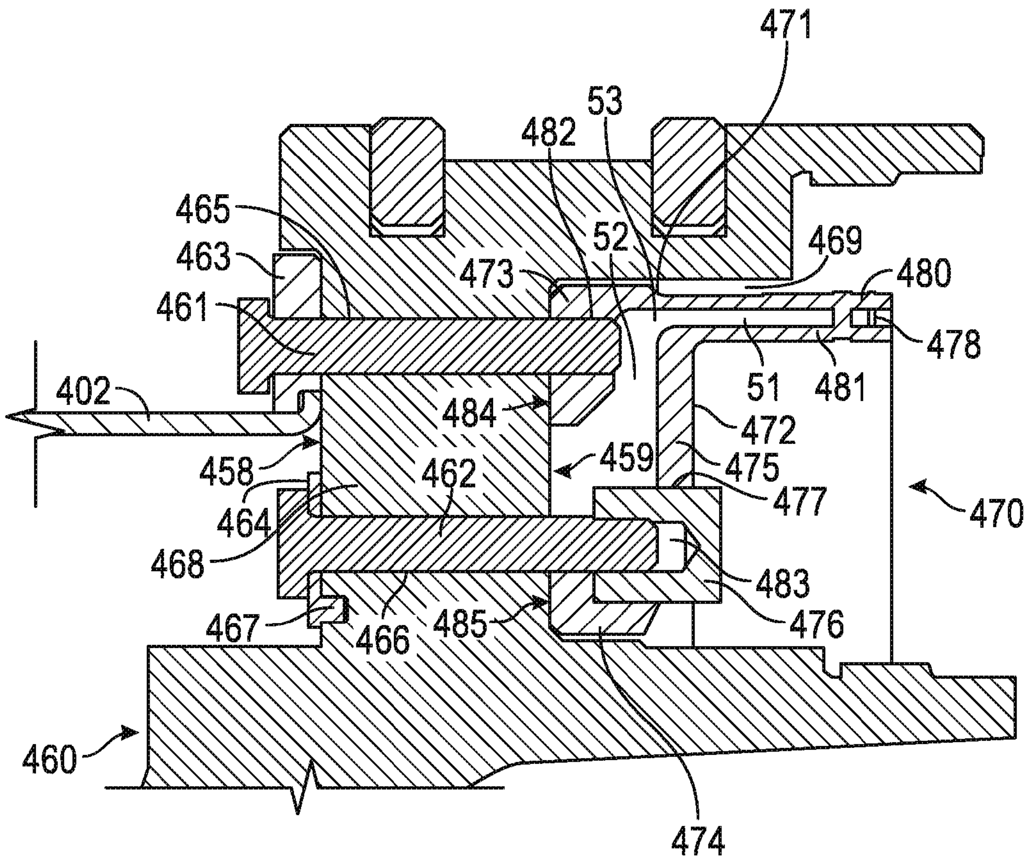
FIG. 3 is a cross-sectional detail view of a gas turbine engine preswirler and diaphragm with a reconfigured connection.

FIG. 3 is a cross-sectional detail view of an embodiment of the gas turbine engine preswirler 470 and diaphragm 460 with a reconfigured connection. Unless noted, the description and numbering used in connection with FIG. 2 applies to the embodiment depicted in FIG. 3 and the description and numbering used in connection with FIG. 3 applies to the embodiment depicted in FIG. 2.

The outer flange 473 and the inner flange 474 of the preswirler 470 define an opening for cooling air there between. The outer flange 473, the inner flange 474, and the back portion 475 define a radial chamber 52 for cooling air. The outer cylindrical portion 480 and the inner cylindrical portion 481 define an annular chamber 51 for cooling air. The annular chamber 51 and the radial chamber 52 are in flow communication. The annular chamber 51 and the radial chamber 52 may be of shapes other than those depicted.

Cooling air from the diaphragm 460 passes through the opening between the outer flange and the inner flange and into the radial chamber 52. The cooling air flows through the radial chamber 52 and into the annular chamber 51. As the cooling air travels through the annular chamber 51 vanes 478 redirect the cooling air to impart a tangential component on the velocity of the cooling air. Vanes 478 are located at the aft end of the annular chamber 51 and extend radially between the aft end of the outer cylindrical portion 480 and the aft end of the inner cylindrical portion 481. Vanes 478 may be angled or curved as necessary to impart the tangential velocity onto the cooling air. The annular chamber 51 and the radial chamber 52 define the passage 53 for cooling air. The passage 53 provides a path for cooling air to the first stage turbine rotor assembly 421 and rotor blades 425 shown in FIG. 2.

The outer flange 473 and the inner flange 474 of the preswirler 470 include a first forward surface 484 and a second forward surface 485 respectively. The mounting portion 468 of the diaphragm 460 includes a first surface 458 and a second surface 459 opposite the first surface 458. The first forward surface 484 and the second forward surface 485 contact the second surface 459 when the preswirler 470 is mounted to the diaphragm 460. Spacers 463 may be used with the outer diameter couplers 461. The spacers 463 may sit flush with the first surface 458. Lock plates 464 may be used with the inner diameter couplers 462. The lock plates may sit flush with first surface 458. The mounting portion 468 may include a plurality of blind holes 467 through the first surface 458. A blind hole 467 may be adjacent to each inner diameter hole 466. Each lock plate 464 may include an anti-rotation tab that inserts into a blind hole 467.

The inner ring 472 may include a plurality of bosses 476. Each boss 476 may be a thickened material and may be configured to receive an inner diameter coupler for mounting the preswirler 470 to the diaphragm 460. In one embodiment each boss 476 may be a cylindrical shape and may be sized to be inserted into a through hole 477 of the preswirler 470.

In a reconfigured connection of the preswirler 470 and diaphragm 460 the bosses 476 may be welded to the inner ring 472. A second hole 483 is machined into each boss 476 for mounting to the diaphragm 460. Similar to other embodiments, an inner diameter coupler 462 passes through an inner diameter hole 466 and into a second hole 483 in a boss 476.

The inner flange 474 may include a radial cavity (not shown in the figures) in the inner flange 474 adjacent to the second forward surface 485. A seal may be inserted into the radial cavity. The seal may contact the radial cavity surfaces and the second surface 459 when the preswirler 470 is mounted to the diaphragm 460. The seal may be a resilient seal such as an E-seal.

Figure 4:
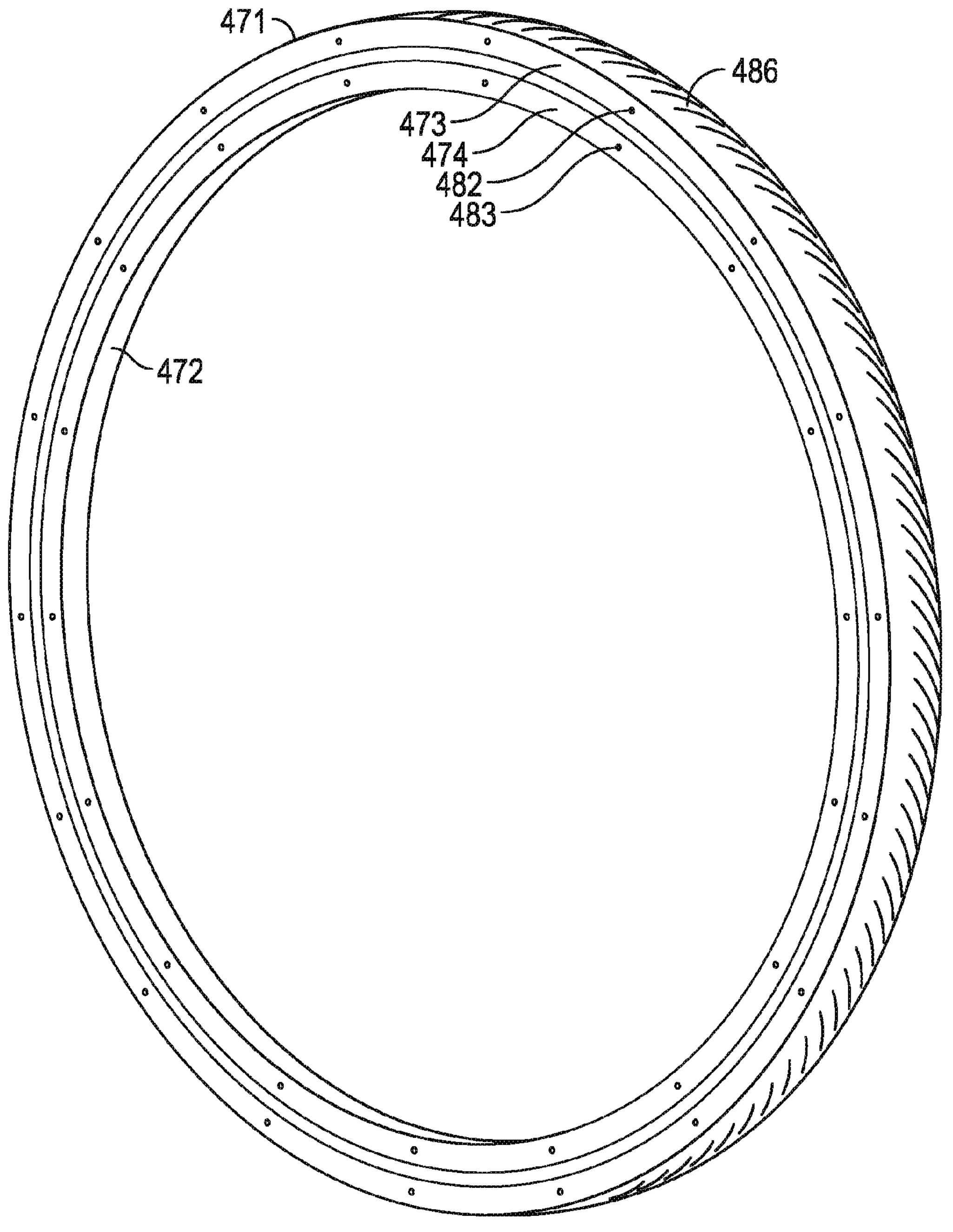
FIG. 4 is a perspective view of a preswirler.

FIG. 4 is a perspective view of the preswirler 470. The preswirler 470 includes an outer ring 471 with a plurality of first holes 482. The outer ring 471 also includes a plurality of cooling holes 486. At least a portion of the cooling air entering the preswirler 470 exits the preswirler 470 through the cooling holes 486. The preswirler 470 also includes an inner ring 472 with a plurality of second holes 483. The preswirler 470 may be used in the gas turbine engine 100 of FIG. 1.

Figure 5:
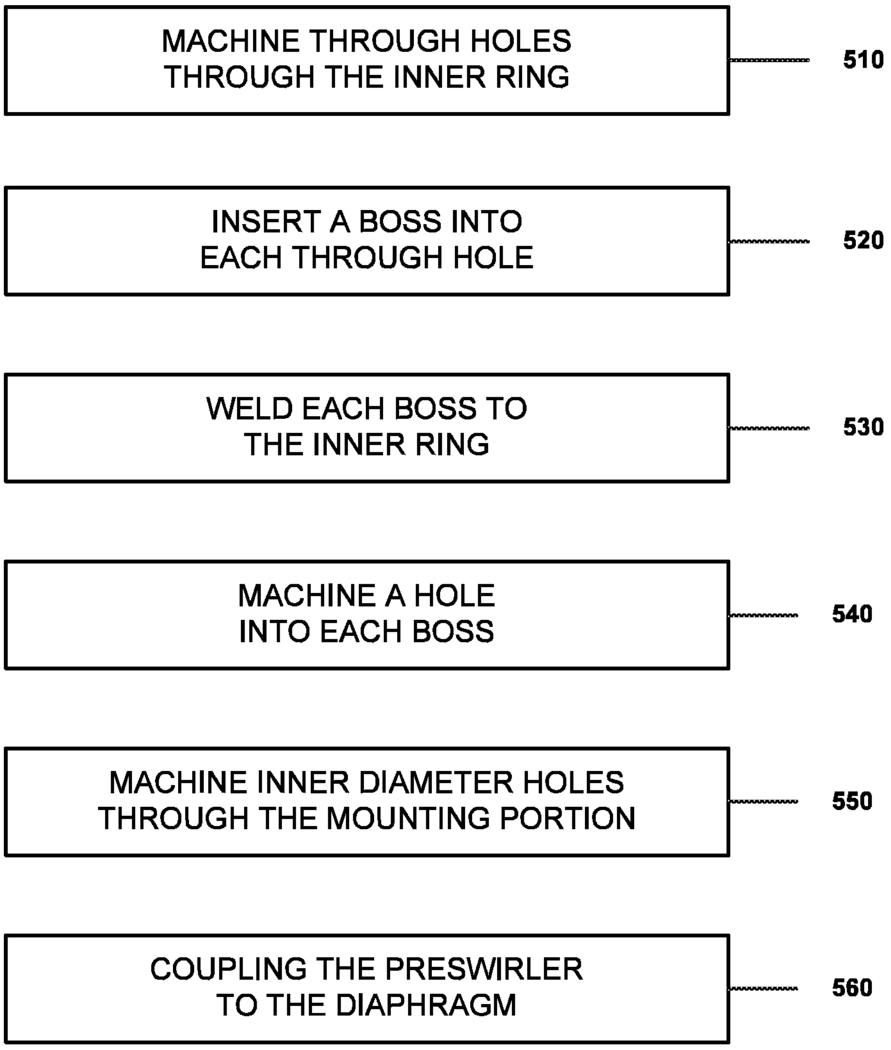
FIG. 5 is a flowchart of a process for reforming an attachment of a preswirler to a diaphragm of a gas turbine engine.

FIG. 5 is a flowchart of a process for mounting a preswirler 470 to a diaphragm 460 in a gas turbine engine 100. The process may be used with the gas turbine engine 100 of FIG. 1 and with the preswirler 470 and the diaphragm 460 of FIG. 3.

In step 510, through holes 477 are machined through the inner ring 472 of the preswirler 470. In step 520, a boss 476 is inserted into each through hole 477. In step 530, each boss 476 is welded to the inner ring 472 of the preswirler 470. In step 540, a second hole 483 is machined into each boss 476. In one embodiment a threaded hole may be machined into each boss 476. In another embodiment the through holes 477 total more than ten and the bosses 476 total more than ten. In yet another embodiment the through holes 477 total eighteen and the bosses 476 total eighteen. In step 540 a plurality of inner diameter holes 466 are machined through a mounting portion 468 of the diaphragm 460 from the first surface 458 to the second surface 459. In one embodiment a blind hole 467 may be machined into the mounting portion 468 at the first surface 458 adjacent to each inner diameter hole 466.

In step 560 the preswirler 470 is coupled to the diaphragm 460. An outer diameter coupler 461 is inserted through each outer diameter hole 465 and into a first hole 482. An inner diameter coupler 462 is inserted through each outer diameter hole 465 and into a second hole 483. In one embodiment a press fit or interference fit may be reduced or removed between the preswirler 470 and the mounting portion 468 that has a cavity 469 to retain the preswirler 470 by the press fit or the interference fit.

In another embodiment a radial cavity may be machined into the inner flange 474 at the second forward surface 485 and a seal may be placed in the radial cavity. The seal may be a resilient seal such as an E-seal. The process of mounting a preswirler 470 to a diaphragm 460 in a gas turbine engine 100 may be modified by adding, omitting, reordering, or altering steps.

INDUSTRIAL APPLICABILITY

Operating efficiency of a gas turbine engine generally increases with a higher combustion temperature. Thus, there is a trend in gas turbine engines to increase the temperatures. Gas reaching a turbine first stage 410 from a combustion chamber 310 may be 1000 degrees Fahrenheit or more. To operate at such high temperatures a portion of the compressed air of the compressor 200 of the gas turbine engine 100 may be diverted through internal passages or chambers to cool the turbine rotor blades 425 in the turbine first stage 410.

The gas reaching the turbine rotor blades 425 in the turbine first stage 410 may also be under high pressure. The cooling air diverted from the compressor 200 may need to be at compressor discharge pressure to effectively cool turbine rotor blades 425 in the turbine first stage 410. Gas turbine engine 100 components containing the internal passages for the cooling air such as a diaphragm 460 and a preswirler 470 may be subject to elevated levels of stress.

Cooling air with a substantially axial flow is diverted from the compressor discharge to a path for cooling air 50. The cooling air passes through the diaphragm 460 and into the preswirler 470. The cooling air is directed radially outward and discharged from the preswirler with a tangential component into the first stage turbine rotor assembly 421.

It was discovered through extensive research and testing that a preswirler connected to a diaphragm by a press fit or an interference fit, and a plurality of mounting bolts located near the outside diameters of the preswirler and the diaphragm may deform due to the temperature, pressure, and forces of the cooling air. The deformation will increase the stress in the bolts, preswirler, and diaphragm. This deformation to the various components may permit a leakage of cooling air causing a loss of efficiency in the gas turbine engine.

A seal between the diaphragm 460 and the preswirler 470 may need to be maintained to prevent cooling air from leaking. It was discovered through extensive research, computer modeling, and testing that a more rigid connection may prevent this deformation and subsequent leakage. A more rigid connection may be formed by constraining the preswirler 470 and the diaphragm 460 by a plurality of outer diameter couplers 461 and a plurality of inner diameter couplers 462. The outer diameter couplers are placed through the outer diameter holes 465 and into the first holes 482 in the outer flange 473. The inner diameter couplers 462 are placed through the inner diameter holes 466 and into the second holes 483 of the inner ring 472. This more rigid connection may prevent deformation of the preswirler 470, and may increase the contact area between the preswirler 470 and the diaphragm 460. Research and testing revealed that the increase in contact area may reduce stress and wear of various gas turbine engine components and increase efficiency.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes particular preswirlers and associated processes, it will be appreciated that other preswirlers and processes in accordance with this disclosure can be implemented in various other turbine stages, configurations, and types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A gas turbine engine, comprising:
- a diaphragm having
  - a mounting portion including
    - a first surface,
    - a second surface opposite the first surface,
    - a plurality of outer diameter holes,
    - a plurality of inner diameter holes,
    - a plurality of cooling holes
    - a plurality of blind holes adjacent to the plurality of inner diameter holes and
    - a plurality of lock plates located between the plurality of inner diameter couplers and the first surface;
- a preswirler having
  - an outer ring including an outer flange including a first forward surface in contact with the second surface, an outer cylindrical portion extending from the outer flange, and a plurality of first holes in the outer flange, and an inner ring including an inner flange spaced apart from the outer flange defining an opening for cooling air in flow communication with the plurality of cooling holes therebetween, the inner flange including a second forward surface in contact with the second surface, an inner cylindrical portion located within the outer cylindrical portion defining an annular chamber for cooling air therebetween, and a back portion extending from the inner flange to the inner cylindrical portion, and a plurality of second holes in the inner ring;

wherein the outer flange, the inner flange, and the back portion define a radial chamber for cooling air therebetween, the radial chamber being in flow communication with the annular chamber and the opening;

a plurality of outer diameter couplers, wherein the plurality of outer diameter holes are aligned with the plurality of first holes, and where each of the plurality of outer diameter couplers passes through an outer diameter hole and into a first hole; and a plurality of inner diameter couplers, wherein the plurality of inner diameter holes are aligned with the plurality of second holes, and where each of the plurality of inner diameter couplers passes through an inner diameter hole and into a second hole.

2. The gas turbine engine of claim 1, wherein the plurality of second holes are in the inner flange.

3. The gas turbine engine of claim 1, wherein the inner ring includes a plurality of bosses with a second hole in each boss.

4. The gas turbine engine of claim 3, wherein each boss is welded to the inner ring.

5. The gas turbine engine of claim 1, wherein the plurality of first holes total more than ten, the plurality of second holes total more than ten, the plurality of outer diameter holes total more than ten, and the plurality of inner diameter holes total more than ten.

6. The gas turbine engine of claim 1, further comprising a plurality of spacers located between the plurality of outer diameter couplers and the first surface.

7. The gas turbine engine of claim 1, wherein the plurality of first holes and the plurality of second holes are threaded, and the plurality outer diameter couplers and the plurality of inner diameter couplers are bolts.

8. A method for mounting a preswirler of a gas turbine engine to a diaphragm, the diaphragm having a mounting portion including a first surface, a second surface, a cavity to retain the preswirler with a press fit, and a plurality of outer diameter holes, and the preswirler having an outer ring including an outer flange with a plurality of first holes in the outer flange, and an inner ring including an inner flange spaced apart from the outer flange and a back portion extending from the inner flange, the method comprising:

machining a plurality of through holes through the inner ring;

inserting one of a plurality of bosses into each of the plurality of through holes;

welding the plurality of bosses to the inner ring;

machining a second hole into each of the plurality of bosses;

machining a plurality of inner diameter holes through the mounting portion from the first surface to the second surface;

decreasing the press fit between the preswirler and the diaphragm; and coupling the preswirler to the diaphragm by inserting an outer diameter coupler through each outer diameter hole and into a first hole, and inserting an inner diameter coupler through each inner diameter hole and into a second hole.

9. The method of claim 8, wherein a blind hole is machined into the mounting portion through the first surface adjacent to each inner diameter hole.

10. The method of claim 8, wherein the plurality of through holes total more than ten and the plurality of bosses total more than ten.

11. The method of claim 8, wherein threaded holes are machined into each of the plurality of bosses.

12. A method for mounting a preswirler of a gas turbine engine to a diaphragm, the diaphragm having a mounting portion including a first surface, a second surface, and a plurality of outer diameter holes, and the preswirler having an outer ring including an outer flange with a plurality of first holes in the outer flange, and an inner ring including an inner flange spaced apart from the outer flange and a back portion extending from the inner flange, the method comprising:

machining a plurality of through holes through the inner ring;

inserting one of a plurality of bosses into each of the plurality of through holes;

welding the plurality of bosses to the inner ring;

machining a second hole into each of the plurality of bosses;

machining a plurality of inner diameter holes through the mounting portion from the first surface to the second surface machining a blind hole into the mounting portion through the first surface adjacent to each inner diameter hole; and coupling the preswirler to the diaphragm by inserting an outer diameter coupler through each outer diameter hole and into a first hole, and inserting an inner diameter coupler through each inner diameter hole and into a second hole.

13. The method of claim 8, wherein the mounting portion having a cavity to retain the preswirler with a press fit, further comprising:

decreasing the press fit between the preswirler and the diaphragm.

14. The method of claim 8, wherein the plurality of through holes total more than ten and the plurality of bosses total more than ten.

15. The method of claim 8, wherein threaded holes are machined into each of the plurality of bosses.

* * * * *